United States Patent [19]

Famili et al.

[11] Patent Number: 5,340,874

[45] Date of Patent: Aug. 23, 1994

[54] MODIFIED POLYVINYL ALCOHOL AND A SOLID STATE PROCESS FOR MODIFICATION OF POLYVINYL ALCOHOL BY FREE RADICAL GRAFTING

[75] Inventors: Amir Famili, Orefield; Lori A. Vratsanos, Breinigsville; Finn L. Marten, Emmaus, all of Pa.

[73] Assignee: Air Products and Chemicals, Inc., Allentown, Pa.

[21] Appl. No.: 88,991

[22] Filed: Jul. 7, 1993

[51] Int. Cl.$^5$ .................. C08L 29/02; C08L 29/04
[52] U.S. Cl. .......................... 525/59; 525/60; 525/62; 525/221; 525/238; 525/260; 525/264; 525/291; 525/296; 525/301; 524/803
[58] Field of Search .............. 525/59, 60, 62, 260, 525/264, 291, 296, 301, 238, 221; 524/803

[56] References Cited

U.S. PATENT DOCUMENTS

| | | | |
|---|---|---|---|
| 3,125,556 | 3/1964 | Lukman et al. | 260/91.3 |
| 4,320,040 | 3/1982 | Fujita et al. | 525/59 |
| 4,323,492 | 4/1982 | Zimmermann et al. | 525/57 |
| 4,529,522 | 7/1985 | Schmitt | 252/8.5 |
| 4,542,178 | 9/1985 | Zimmermann et al. | 525/57 |
| 4,545,911 | 10/1985 | Schmitt | 252/8.5 |
| 4,775,715 | 10/1988 | Berensniewicz et al. | 525/61 |
| 4,822,851 | 4/1989 | Stober et al. | 525/61 |
| 4,849,256 | 7/1989 | Newmann et al. | 525/61 |
| 5,001,191 | 3/1991 | Stober et al. | 525/61 |

FOREIGN PATENT DOCUMENTS

| | | |
|---|---|---|
| 128345 | 12/1984 | European Pat. Off. |
| 56-73199 | 6/1981 | Japan. |
| 60-56196 | 12/1985 | Japan. |
| 63-270704 | 11/1988 | Japan. |
| 1-34245 | 7/1989 | Japan. |

OTHER PUBLICATIONS

*Polyvinyl Alcohol;* ed. C. A. Finch, Wiley; 1973; pp. 183–202.

*Primary Examiner*—James J. Seidleck
*Assistant Examiner*—W. Robinson H. Clark
*Attorney, Agent, or Firm*—Mary E. Bongiorno; James C. Simmons; William F. Marsh

[57] ABSTRACT

A modified polyvinyl alcohol and a solid state process for producing modified polyvinyl alcohol wherein polyvinyl alcohol powder is sprayed with a sufficient amount of a solution of a polymerizable monomer to swell the polyvinyl alcohol powder but not dissolve it or form a slurry. The swollen polyvinyl alcohol powder is sprayed with a free radical source (an initiator) and the temperature is raised to initiate a reaction between polyvinyl alcohol and the polymerizable monomer.

18 Claims, No Drawings

MODIFIED POLYVINYL ALCOHOL AND A SOLID STATE PROCESS FOR MODIFICATION OF POLYVINYL ALCOHOL BY FREE RADICAL GRAFTING

FIELD OF THE INVENTION

The present invention relates a modified polyvinyl alcohol and its preparation using a solid state post-modification.

BACKGROUND OF THE INVENTION

Polyvinyl alcohol is the largest volume, synthetic, water-soluble and biodegradable resin produced in the world. Its success is due in part to its excellent chemical resistance and physical properties as well as to its very low toxicity. The main applications for polyvinyl alcohol are in textile sizing, adhesives, polymerization stabilizers and paper coatings. As demand increases for better performance in these and other areas, more attention is given to production of polyvinyl alcohol derivatives which can meet the demand. Chemically modifying polyvinyl alcohol by introducing functional groups (for example, sulfonates, phosphates and carboxylates) through copolymerization or post-modification is one means of enhancing the physical properties of polyvinyl alcohol.

Copolymerization of vinyl acetate with functional vinyl monomers followed by saponification is a well-known route to modification of polyvinyl alcohol. Some applications of this technology are exemplified in the following patents:

JP 56-73199 teaches copolymerization of vinyl acetate with 2-acryl amidopropanesulfonic acid or its metal salts, to produce a polymer with improved flow properties for application in paper coatings.

U.S. Pat. No. 4,529,522 teaches production of copolymers of polyvinyl alcohol and ethylene oxide or propylene oxide sulfonate ethers for use as viscosifiers in saline solutions.

JP 60-56196 teaches copolymerization of vinyl acetate with 0.1 to 0.3 mole percent sodium vinyl sulfonate or sodium allyl sulfonate and hydrolysis of 30 to 60 percent the resulting copolymer. The product is used in hot melt adhesives.

JP 63-270704 teaches the manufacture of high polymerization degree sulfonic acid-containing modified polyvinyl alcohol by copolymerizing N-sulfoalkyl(-meth)acrylamide and vinyl ester and then saponifying the resulting copolymer. The products are useful as emulsifiers.

Copolymerization allows the incorporation of a wide variety of functional monomers, but entails large capital investment for recovery of unreacted monomer. Differences in reactivity ratios may also make it difficult to produce the desired functional level and tool molecular weight.

Production of specialized grades of modified polyvinyl alcohol in small to moderate volumes can be more economically achieved through post-modification. Post-modification also provides a versatile process for producing a variety of specialized products using a single process unit.

Post-modification of polyvinyl alcohol is usually carried out in water solution. See *Polyvinyl Alcohol*, edited by C. A. Finch, Wiley, 1973, pages 183–202, for an exhaustive list of reactions for polyvinyl alcohol in solution. Following are examples of solution modification in the patent literature are:

EP-128,345 teaches the reaction of polyvinyl alcohol with alkenal-3-sulfonic acid in aqueous solution to form a product used in textile sizing or emulsifiers.

U.S. Pat. No. 4,545,911 teaches grafting pyrrolidium methane sulfonate salt onto the alcohol oxygens of polyvinyl alcohols to form viscosifiers which are useful in waterflooding and in drawing fluids.

A few post-modification processes are known for slurry or solid state reactions.

U.S. Pat. No. 3,125,556 teaches the alkoxylation of polyvinyl alcohol in which an organic polar swelling agent may be added to the polyvinyl alcohol prior to alkoxylation.

U.S. Pat. No. 4,775,715 teaches preparation of cationic polyvinyl alcohol by blending polyvinyl alcohol under high shear conditions, at 0° to 100° C. with a small amount of water, a small excess of base, and a quaternizing agent.

JP 1-34245 teaches a method for preparing a polyvinyl alcohol type resin containing an acetoacetic ester by mixing a finely divided polyvinyl alcohol powder with diketene in a high intensity mixer.

U.S. Pat. No. 4,822,851 and U.S. Pat. No. 5,001,191 teach a dry blending process for the preparation of cationized polyvinyl alcohol in which polyvinyl alcohol, preferably in powder form, reacts with alkylidene epoxides in an alkaline medium in the presence of water.

SUMMARY OF THE INVENTION

This invention relates to a modified polyvinyl alcohol and its preparation by free radical grafting using a solid state process. Polyvinyl alcohol powder is sprayed with a polymerizable monomer in a solvent and the polyvinyl alcohol is allowed to swell. Alternately, instead of a dry polyvinyl alcohol powder, swollen polyvinyl alcohol particles are used; the swollen particles are produced in the saponification of polyvinyl acetate with a primary alcohol using an alkali catalyst. A free radical source, or initiator, is then sprayed onto the swollen polyvinyl alcohol and the temperature is raised to initiate the reaction between the polyvinyl alcohol and the monomer. The modified polyvinyl alcohol product may be recovered as a solid and used as is or dried to remove residual solvent.

The major advantages to this invention are:
- it provides a versatile process for producing a variety of specialized polyvinyl alcohol copolymers using a single process unit;
- it produces a product which is recoverable as a solid without further processing;
- it provides a low cost method for producing functionalized polyvinyl alcohol; and
- it produces a unique product in which modification of polyvinyl alcohol takes place through short chain branching from the polyvinyl alcohol backbone.

DETAILED DESCRIPTION OF THE INVENTION

Modified polyvinyl alcohol polymers are produced by spraying a solution of an appropriate polymerizable monomer onto dry polyvinyl alcohol powder under agitation. The polyvinyl alcohol powder is allowed to swell and thus give good transport of the monomer throughout the polyvinyl alcohol particles. It is preferable to add the polymerizable monomer in the beginning with the solvent in order to keep the amount of solvent in the system to a minimum; however, a solvent can be added separately to swell the polyvinyl alcohol powder followed by addition of the reactive monomer in a solvent. After a sufficient amount of swelling has occurred, a free-radical source, or initiator, is sprayed onto the swollen powder and the temperature is raised to start the reaction between the monomer and the polyvinyl alcohol. Alternately, the temperature can be raised before spraying the initiator onto the swollen powder. The time required to swell the polyvinyl alcohol powder is determined visually when an increase in volume of the powder is noted, typically about 20 minutes is allowed. However, by the time all of the monomer solution is added, the polymer is usually fully swollen.

The reaction is carried out in any apparatus capable of giving good agitation of solids, including blenders, high intensity mixers, ribbon blenders, sigma blade mixers and the like. Misters or spraying equipment, commonly known in the art, can be used to spray the solution of polymerizable monomer and the initiator onto the swollen polyvinyl alcohol.

Polyvinyl alcohol is used as a dry powder, preferably having a particle size of less than about 5 min. The degree of polymerization (DPn) of the polyvinyl alcohol depends on the application anticipated for the graft copolymer product; it can range from about 50 to 5000, preferably 200 to 3000. The degree of hydrolysis of polyvinyl alcohol can vary from about 70 mole % to about 99.9 mole %, preferably 87 mole % to 98.9 mole 4. Partially hydrolyzed polyvinyl alcohol is preferred because it swells better; especially preferred is 87 mole % to 89 mole % hydrolyzed polyvinyl alcohol. Compounds suitable as modifiers include any water-soluble and/or alcohol-soluble olefinically unsaturated monomer capable of free radical addition. For example, vinyl sulfonic acid and its salts (for example, sodium and ammonium salts), allyl sulfonic acid and its salts, methallyl sulfonic acid and its salts, acrylamide and its derivatives including N-methylol acrylamide and 2-acrylamido methylpropane-sulfonic acid, acrylic acid, methacrylic acid, and acrylonitrile. The amount of monomer can range from about 0.1 mole % to 100 mole % based on the tool e percent of polyvinyl alcohol units; 2 mole % to 20 mole % of monomer is preferred. Alternately, the polyvinyl alcohol can be in the form of swollen particles which are produced in the saponification of polyvinyl acetate to polyvinyl alcohol. The saponification process involves an ester exchange between polyvinyl acetate and a primary alcohol in the presence of a base catalyst such as sodium hydroxide or sodium methoxide. A drying process normally follows saponification to remove alcohol and produce a final polyvinyl alcohol product.

Water is the best solvent for the monomer for cost and safety reasons, but other solvents which dissolve or swell polyvinyl alcohol and dissolve or disperse the reactant monomer may be used. Examples of suitable solvents include methanol, ethanol, tetrahydrofuran, and dimethylsulfoxide. The amount of solvent used must be enough to swell the polyvinyl alcohol but not enough to cause stickiness, dissolution, or a slurry of the polyvinyl alcohol. One skilled in the art will be able to determine the appropriate amount of solvent based on the degree of polymerization and the degree of hydrolysis of the polyvinyl alcohol. For example, for water, 25 wt % water based on polyvinyl alcohol with 88 mole % hydrolysis and 300 DPn is used; for methanol, 30 wt % methanol based on polyvinyl alcohol with 88 mole % hydrolysis and 300 DPn is used. The addition of a processing aid such as glycerol monooleate (GMO) can facilitate mixing with less sticking of the powder and can allow the addition of larger amounts of modifier without affecting the product properties.

Appropriate initiators include sodium, potassium or ammonium persulfate, peroxides, or azo compounds. Approximately 0.01% by weight to about 5% by weight (preferably 1% by weight) of initiator based on polyvinyl alcohol present is sprayed onto the swollen polyvinyl alcohol, under constant agitation. Staged addition of solubilized monomer and initiator controls the distribution of grafted units and the number of units added at a free radical position. This method enables more grafting sites and grafting of shorter chains of monomers (i.e., chains of about 10 or less monomers).

A buffer such as sodium bicarbonate may be added to neutralize the acid formed from decomposition of persulfate and to avoid color formation. Sodium persulfate produces the least color.

The reaction temperature will be at least that temperature necessary to liberate free radicals to effect the graft polymerization; it can vary from about 50° C. to about 100° C.; the preferred temperature range is 70° C. to 90° C. Reaction time will vary from about 50 minutes to about 120 minutes and will depend on the temperature. In general, at least two half-lives of initiator allow the reaction to go substantially to completion. The solvents are driven off during the reaction, leaving a substantially dry product. The modified polyvinyl alcohol may be recovered as a solid and used as is or dried to remove residual solvent. It may also be washed to remove residual salts and monomers.

The following examples are intended to illustrate embodiments of the invention and are not intended to restrict the scope thereof.

EXAMPLE 1

In a Littleford compounding mixer, 2000 g of Airvol® 205 polyvinyl alcohol (500 DPn, 88 mole % hydrolyzed) was mixed with 7 g of sodium bicarbonate. Glycerol monooleate (GMO), 20.3 g, was then added and the mixing rate was increased to raise the temperature to 70° C. A total of 786.6 g of 25 wt % aqueous solution of sodium vinyl sulfonate (SVS) was added over a 60 minute period and the temperature was allowed to rise to 75° C. A solution of 10 g of sodium persulfate in 100 g of water was added in three stages, twenty minutes apart, during the monomer addition. The temperature was raised to 85° C. and held at that temperature for two hours. The SVS-modified polyvinyl alcohol was then cooled to 30° C. and removed.

EXAMPLE 2

In a Waring blender, 5.27 g of GMO and 1.77 g of sodium bicarbonate were added to 500 g of Airvol® 205 polyvinyl alcohol. Using a spray bottle, 311.4 g of a 35 wt % solution of sodium allyl sulfonate was added over a period of 60 minutes. Sodium persulfate (2.54 g in 20 g of water) was added in three stages twenty minutes apart during the monomer addition. The mixture was placed in an 85° C. oven for 2 hours to complete the reaction.

EXAMPLES 3–5

Yields of Grafted Polyvinyl Alcohol

In a Littleford W10 high intensity mixer, 20 g of glycerol monooleate (GMO) was added to 2 kg of Airvol® 205 polyvinyl alcohol powder and mixing started. Sodium bicarbonate (20 g) was then added. A solution of monomer (see Table 1) was sprayed over the circulating powder over a 1-hour period. A solution of 40 g sodium persulfate in 100 g of DI water was added in three stages throughout the monomer addition and the temperature was maintained at 90° C. After addition of monomer and sodium persulfate, the powder was circulated at 90° C. for 60 minutes. Samples were extracted with boiling methanol for 8 hours to remove unreacted monomer. The extracted polymer was put into dilute solution and analyzed for sulfur using inductively coupled plasma atomic emission spectroscopy (ICP-AES). The yields of grafted polyvinyl alcohol were calculated by comparing the amount of monomer added to the amount of monomer present in the grafted polymer as measured by ICP-AES. The results are shown in Table 2.

TABLE 1

| Example | Monomer | Weight Percent Solution | Grams of Solution Added |
|---|---|---|---|
| 3 | Sodium allyl sulfonate | 35 | 1200 |
| 4 | Sodium vinyl sulfonate | 25 | 286.6 |
| 5 | Sodium methallyl sulfonate | 40 | 1190 |

TABLE 2

| Example | Monomer | Weight Percent Monomer Added | Weight Percent Monomer Grafted | Grafting Yield (%) |
|---|---|---|---|---|
| 3 | Sodium allyl sulfonate | 17.36 | 9.5 | 54.72 |
| 4 | Sodium vinyl sulfonate | 8.95 | 6.5 | 72.63 |
| 5 | Sodium methallyl sulfonate | 19.25 | 3.9 | 20.25 |

STATEMENT OF INDUSTRIAL USE

Modified polyvinyl alcohol produced by this process may be used in paper coatings, as super adsorbents, as emuslion stabilizers, or for pigment dispersal.

We claim:

1. A method for modifying polyvinyl alcohol comprising:
   (a) spraying a polyvinyl alcohol powder with an amount of a solvent containing a free radical polymerizable monomer such that the solvent swells the polyvinyl alcohol powder but does not form a slurry with the polyvinyl alcohol powder and does not dissolve the polyvinyl alcohol powder;
   (b) allowing the sprayed polyvinyl alcohol powder to swell;
   (c) spraying a free radical source onto the swollen polyvinyl alcohol powder; and
   (d) raising the temperature of the swollen polyvinyl alcohol powder to initiate a reaction between the polyvinyl alcohol and the polymerizable monomer.

2. The method of claim 1 wherein the polyvinyl alcohol powder is maintained under constant agitation.

3. The method of claim 1 wherein the polyvinyl alcohol has a particle size of less than about 5 mm.

4. The method of claim 3 wherein the polymerizable monomer is selected from the group consisting of vinyl sulfonic acid, a vinyl solfonic acid salt, allyl sulfonic acid, an allyl sulfonic acid salt, methallyl sulfonic acid, a methallyl sulfonic acid salt, acrylamide, N-methylol acrylamide, 2-acrylamido methylpropane sulfonic acid, acrylonitrile, acrylic acid, methacrylic acid, and mixtures thereof.

5. The method of claim 4 wherein the polymerizable monomer is allyl sulfonic acid or an allyl sulfonic acid salt.

6. The method of claim 4 wherein the polyvinyl alcohol is 87 mole % to 89 mole % hydrolyzed.

7. The method of claim 4 wherein the solvent is water.

8. The method of claim 7 wherein glycerol monooleate is added to facilitate mixing.

9. The method of claim 4 wherein the polymerizable monomer and the free radical source are added in stages.

10. A modified polyvinyl alcohol formed by the method of claim 3.

11. A modified polyvinyl alcohol formed by the method of claim 4.

12. A modified polyvinyl alcohol formed by the method of claim 5.

13. A modified polyvinyl alcohol formed by the method of claim 6.

14. A modified polyvinyl alcohol formed by the method of claim 7.

15. A modified polyvinyl alcohol formed by the method of claim 8.

16. A modified polyvinyl alcohol formed by the method of claim 9.

17. In a method for making modified polyvinyl alcohol by saponification of polyvinyl acetate with an alcohol to yield alcohol swollen polyvinyl alcohol particles, drying the polyvinyl alcohol particles, and subsequently modifying the polyvinyl alcohol, the improvement which comprises:
   (a) spraying the swollen polyvinyl alcohol particles with an amount of a solvent containing a polymerizable monomer such that the solvent does not form a slurry with the polyvinyl alcohol particles and does not dissolve the polyvinyl alcohol;
   (b) spraying a free radical source onto the swollen polyvinyl alcohol particles; and
   (c) raising the temperature of the swollen polyvinyl alcohol particles to initiate a reaction between the polyvinyl alcohol and the polymerizable monomer.

18. A modified polyvinyl alcohol formed by the method of claim 17 wherein the polyvinyl alcohol powder has a particle size of less than about 5 mm.

* * * * *